United States Patent Office 2,892,281
Patented June 30, 1959

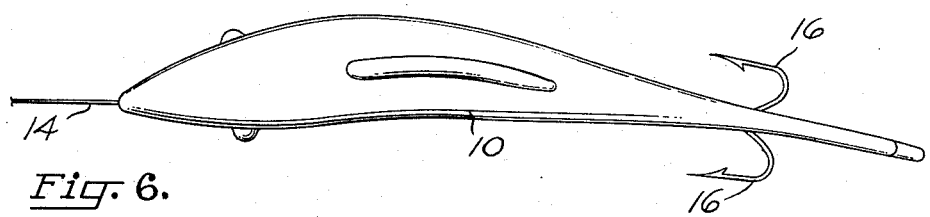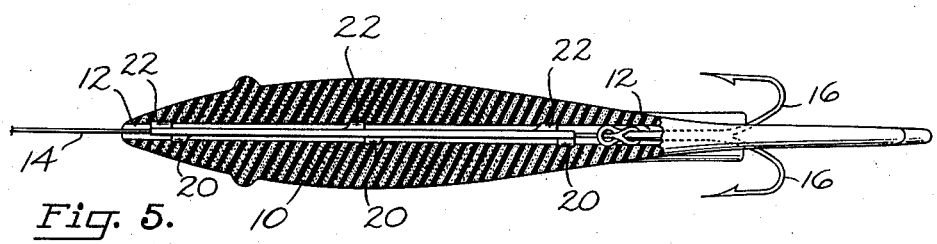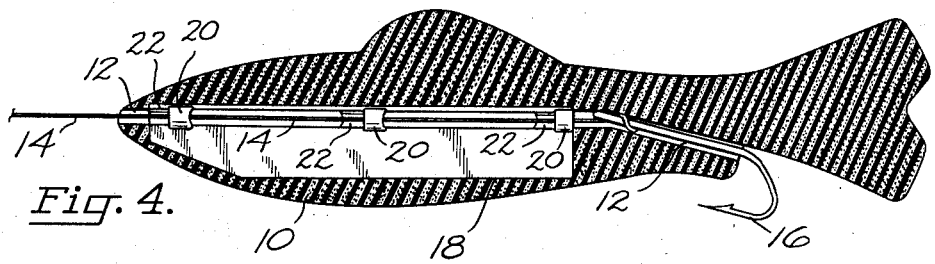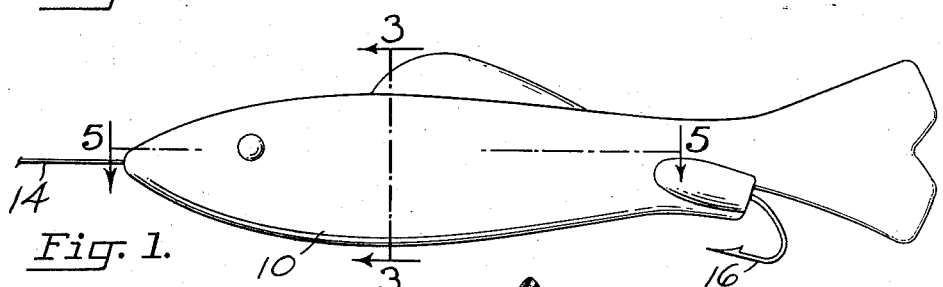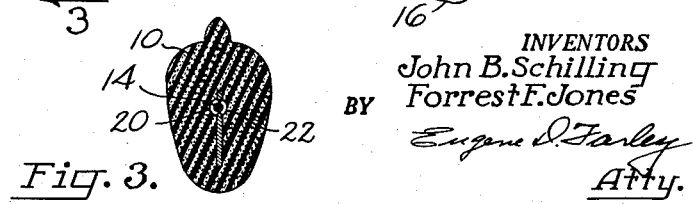

2,892,281

FISH LURE

John B. Schilling and Forrest F. Jones, Portland, Oreg.

Application October 21, 1957, Serial No. 691,226

1 Claim. (Cl. 43—42.36)

This invention relates to artificial fish lures.

It is the general object of this invention to provide an artificial fish lure which resembles a herring or other small fish and which moves in a lifelike manner when drawn through the water.

It is another object of this invention to provide an artificial fish lure which may be adjusted so that when drawn through the water varying motions may be imparted to it, as required to simulate the motions of a small fish.

Still another object of the present invention is the provision of an artificial fish lure, the body of which tends to separate from the hooks when a fish is hooked so that the fish may be played more effectively.

It is a further object of this invention to provide an artificial fish lure made of tough, durable material which is not easily damaged by striking fish, which is resistant to the action of water and the atmosphere, and which accordingly has a long service life.

The manner in which the foregoing and other objects of this invention are accomplished will be apparent from the accompanying specification and claim considered together with the drawings, wherein like numerals of reference indicate like parts and wherein:

Fig. 1 is a view in side elevation of the herein described fish lure;

Fig. 2 is a plan view of the herein described fish lure;

Fig. 3 is a transverse sectional view taken along line 3—3 of Fig. 1;

Fig. 4 is a longitudinal sectional view taken along line 4—4 of Fig. 2;

Fig. 5 is another longitudinal sectional view taken along line 5—5 of Fig. 1; and Fig. 6 is a top plan view similar to Fig. 2 but illustrating the fish lure with its body curved to impart erratic motion to it when it is drawn through the water.

Referring more particularly to the drawings:

The body 10 of our herein described fish lure may be shaped to resemble a herring or other small fish customarily sought as food by game fish. Accordingly, it is appropriately contoured and coated. It preferably is made of foamed plastic or rubber so that it has an inherent buoyancy.

The body is provided with a longitudinal central opening 12 which communicates with the exterior at both ends, and the rearward portion of which is angled downwardly in the manner apparent in the drawings. This opening serves as a passageway for receiving a leader 14 attached to a single, double or treble hook 16, the shank of which is received by the downwardly angled portion of the opening.

Embedded within the lower portion of body 10 is a vertically disposed plate 18. This member may be made of a deformable, corrosion resistant metal such as brass or bronze and serves two functions. First, it serves as a balancing member, keeping the body normally in an upright position as it moves through the water. Secondly, being deformable and of substantial dimensions, it may be bent by pressure applied to the outside of the body so that the body itself is deformed to an arcuate contour such as is illustrated in Fig. 6. As a consequence, an erratic life-like motion is imparted to the lure.

Guide means also are provided for guiding leader 14 as it is introduced into the body and for preventing it from cutting the material of which the body is made when the lure is used. Preferably the guide means are formed as oppositely directed arcuate segments 20, 22 of plate 18. Accordingly leader 14 may be inserted in opening 12 whereupon it is guided through the body and maintained in position by means of the guides.

It will be apparent further that when a fish strikes the lure and is being played, body 10 can slip forwardly along leader 14 so that it becomes separated from hook 16 upon which the fish is impaled. As a result, the body is protected from damage and the fish may be played more effectively.

It is to be understood that the form of our invention herein shown and described is to be taken as a preferred example of the same and that various changes in the shape, size and arrangement of parts may be resorted to without departing from the spirit of our invention or the scope of the subjoined claim.

Having thus described our invention, we claim:

A fish lure comprising a buoyant body resembling a small fish and formed from a resilient material, the body having a longitudinal bore, the rearward portion of the bore being adapted to freely receive the shank of a fishhook, a metal plate in the body mounted vertically lengthwise of the body and having its upper edge disposed adjacent the longitudinal bore, the plate being bendable for imparting a predetermined and variable degree of curvature to the body, and arcuate guide means on the upper edge of the plate projecting into the bore, the guide means comprising oppositely directed arcuate segments struck from the plate and adapted to receive therebetween a leader attached to the fishhook, said guide means being dimensioned to receive the leader for free sliding movement therein, whereby the lure may slide forwardly on the leader.

References Cited in the file of this patent

UNITED STATES PATENTS

| | | |
|---|---|---|
| 360,339 | Cooke | Mar. 29, 1887 |
| 1,777,004 | Lemere et al. | Sept. 30, 1930 |
| 2,136,713 | Schnabel | Nov. 15, 1938 |
| 2,235,600 | Ammerman | Mar. 18, 1941 |
| 2,325,107 | Burns | July 17, 1943 |
| 2,733,538 | Alimas | Feb. 7, 1956 |
| 2,741,058 | Allman | Apr. 10, 1956 |
| 2,776,518 | Felmlee | Jan. 8, 1957 |